(12) United States Patent
Koyomogi

(10) Patent No.: US 8,327,876 B2
(45) Date of Patent: Dec. 11, 2012

(54) FLUID CONTROLLER

(75) Inventor: Mutsunori Koyomogi, Osaka (JP)

(73) Assignee: Fujikin Incorporated, Osaka (JP)

( * ) Notice: Subject to any disclaimer, the term of this patent is extended or adjusted under 35 U.S.C. 154(b) by 417 days.

(21) Appl. No.: 12/449,020

(22) PCT Filed: Jan. 15, 2008

(86) PCT No.: PCT/JP2008/050317
§ 371 (c)(1),
(2), (4) Date: Jul. 21, 2009

(87) PCT Pub. No.: WO2008/093529
PCT Pub. Date: Aug. 7, 2008

(65) Prior Publication Data
US 2010/0072413 A1   Mar. 25, 2010

(30) Foreign Application Priority Data

Jan. 29, 2007   (JP) .................................. 2007-17490

(51) Int. Cl.
*F16K 31/12* (2006.01)
*F16K 31/36* (2006.01)
(52) U.S. Cl. ................. 137/505; 137/505.37; 251/64
(58) Field of Classification Search .............. 137/505, 137/505.42, 505.37; 251/64; 188/378–380
See application file for complete search history.

(56) References Cited

U.S. PATENT DOCUMENTS

| | | | | |
|---|---|---|---|---|
| 3,812,877 A | * | 5/1974 | Fleischhacker et al. | 137/505.42 |
| 4,825,983 A | * | 5/1989 | Nakanishi | 188/378 |
| 5,538,332 A | * | 7/1996 | Carroll | 303/28 |
| 5,816,373 A | * | 10/1998 | Osterberg et al. | 188/380 |
| 6,536,567 B2 | * | 3/2003 | Nakanishi | 188/378 |
| 6,920,967 B2 | * | 7/2005 | Wood | 188/380 |
| 7,290,644 B2 | * | 11/2007 | Miyake | 188/379 |
| 2007/0080309 A1 | * | 4/2007 | Daake et al. | 251/63.5 |

FOREIGN PATENT DOCUMENTS

| | | |
|---|---|---|
| JP | 01-182647 A | 7/1989 |
| JP | 4-13586 | 2/1990 |
| JP | 06-305563 A | 11/1994 |
| JP | 10-272376 A | 10/1998 |
| JP | 10-339354 A | 12/1998 |
| JP | 2005-199391 A | 7/2005 |

OTHER PUBLICATIONS

International Search Report mailed Feb. 12, 2008, issued on PCT/JP2008/050317.

* cited by examiner

*Primary Examiner* — Craig Schneider
*Assistant Examiner* — Seth Faulb
(74) *Attorney, Agent, or Firm* — Edwards Wildman Palmer LLP; James E. Armstrong, IV; Stephen D. LeBarron

(57) ABSTRACT

There is provided a fluid controller having an enhanced vibration preventing characteristic without affecting pressure controlling operations. A valve element 4 is moved with respect to a valve seat 3 due to a change of balance between a fluid pressure acting on a diaphragm 10 and an elastic force of a pressure-setting spring 13, thereby controlling a pressure of a fluid. A vibration prevention member 17 is placed in a disk-shaped movable member 12 which moves integrally with the diaphragm 10. The vibration prevention member 17 includes a casing which incorporates therein a weight member interposed between elastic members.

14 Claims, 4 Drawing Sheets ent functions of the fluid controller (the function of the pressure controlling operations for a pressure reducing effect), thereby enabling proper adjustment in a wide range from a low-flow-rate range to a high-flow-rate range. Note that the aforementioned vibration preventing effect does not absorb vibrations by friction, thereby preventing degradation of the operation sensitivity caused by friction. Therefore, both size reduction and performance improvement can be achieved, even in cases where an area of the diaphragm which receives the pressure is reduced due to size reduction of the fluid controller.

FLUID CONTROLLER

TECHNICAL FIELD

The present invention relates to a fluid controller which is called a pressure reducing valve or the like and, more particularly, relates to a fluid controller with an enhanced vibration preventing characteristic.

BACKGROUND ART

As a vibration suppressing mechanism for a fluid controller, Patent Document 1 discloses a fluid controller including a diaphragm which partitions the inside of the fluid controller into a valve chamber and a control chamber, a valve seat and a valve element which are provided in the valve-chamber side with respect to the diaphragm, and a pressure-setting spring provided in the control-chamber side with respect to the diaphragm, wherein a vibration preventing spring for changing an overall spring constant and an overall weight is interposed between the diaphragm and the pressure-setting spring.

Patent Document 1: Japanese Examined Patent Publication No. 04-13586 (FIG. 1)

SUMMARY OF THE INVENTION

Problems to be Solved by the Invention

With the fluid controller in Patent Document 1, provision of a vibration preventing spring offers effects similar to those of changing a specification of a pressure-setting spring, which has induced a problem of influences exerted on opening and closing of a diaphragm, namely pressure controlling operations.

It is an object of the present invention to provide a fluid controller with an enhanced vibration preventing characteristic without exerting influences on the pressure controlling operations.

A fluid controller according to the present invention includes a diaphragm which partitions an inside of the fluid controller into a valve chamber and a control chamber, a valve seat and a valve element which are provided in the valve chamber, and a pressure-setting spring provided in the control chamber, the fluid controller being adapted to move the valve element with respect to the valve seat for controlling a pressure of a fluid through a change of balance between a fluid pressure acting on the diaphragm and an elastic force of the pressure-setting spring, wherein a vibration prevention member is placed in a movable member which moves integrally with the diaphragm, and the vibration prevention member includes a casing which incorporates therein a weight member interposed between elastic members.

The diaphragm is formed to have a substantially disk shape having an annular convex portion near an outer peripheral edge portion thereof, and the outer peripheral edge portion is secured to the casing of the fluid controller, while the portion other than the outer peripheral edge portion is formed to be a movable portion.

The movable member is formed to have, for example, a disk shape and an outer diameter with substantially the same size as that of the outer diameter of the movable portion of the diaphragm, such that a center portion thereof is formed to be a portion for receiving the pressure-setting spring, and the vibration prevention member is secured to the portion corresponding to the annular convex portion of the diaphragm.

The vibration prevention member may be formed to have a doughnut shape, and only a single vibration prevention member may be used. In addition, the vibration prevention member may be divided in a circumferential direction into a plurality of parts which form a doughnut shape as a whole. Moreover, a plurality of vibration prevention members may be employed, and may be placed at predetermined intervals in the circumferential direction. In the case where the plurality of vibration prevention members are placed at predetermined intervals in the circumferential direction, the number of the vibration prevention members can be 2, 4, 8 or the like.

The elastic members can be any member capable of vibrating along with the vibration of the weight member and can be either a complete elastic member such as the coil spring or a viscous elastic member which is called a gel. The weight member is formed to have a rectangular cylindrical shape, a circular cylindrical shape, an annular shape, a spherical shape or the like. The casing is formed to have a doughnut shape with a rectangular or circular cross section, a rectangular tubular shape, a circular tubular shape or the like.

A natural frequency of the vibration prevention member is adjusted so as to agree with a natural frequency of the movable portion including the diaphragm and the movable member and, consequently, the vibration prevention member vibrates along with the vibration of the diaphragm (a vibration at a high frequency), so that their vibrations are cancelled by each other, thereby alleviating the vibrations. The pressure controlling operations are operations at lower frequencies and, therefore, the vibration of the vibration prevention member does not degrade the function of the pressure controlling operations. Thus, it is possible to provide a fluid controller capable of preventing resonance without degrading the inherent functions of the fluid controller (the function of the pressure controlling operations for a pressure reducing effect), thereby enabling proper adjustment in a wide range from a low-flow-rate range to a high-flow-rate range. Note that the aforementioned vibration preventing effect does not absorb vibrations by friction, thereby preventing degradation of the operation sensitivity caused by friction. Therefore, both size reduction and performance improvement can be achieved, even in cases where an area of the diaphragm which receives the pressure is reduced due to size reduction of the fluid controller.

The vibration prevention member may include a casing, a first coil spring placed at a bottom wall-side of the casing, a second coil spring placed at a top wall-side of the casing, and a weight member interposed between both of the coil springs. The vibration prevention member may also include a casing, a gel enclosed within the casing, and a weight member inserted in the gel and sandwiched by the gel at a bottom-wall side and a top-wall side thereof.

In any of the cases, it is possible to easily set the frequency of the vibration prevention member (the frequency which prevents resonance), by changing the characteristics of the weight member (the weight and the like thereof) and the characteristics of the elastic members (the spring constant of coil springs, rigidity and viscosity of a gel, and the like).

Effects of the Invention

With the fluid controller according to the present invention, since the vibration prevention member includes a casing which incorporates therein a weight member interposed between elastic members, the vibration prevention member itself does not directly exert an elastic force on the diaphragm. Therefore, the vibration preventing characteristic can be enhanced without affecting the pressure controlling operations.

Figure 1:
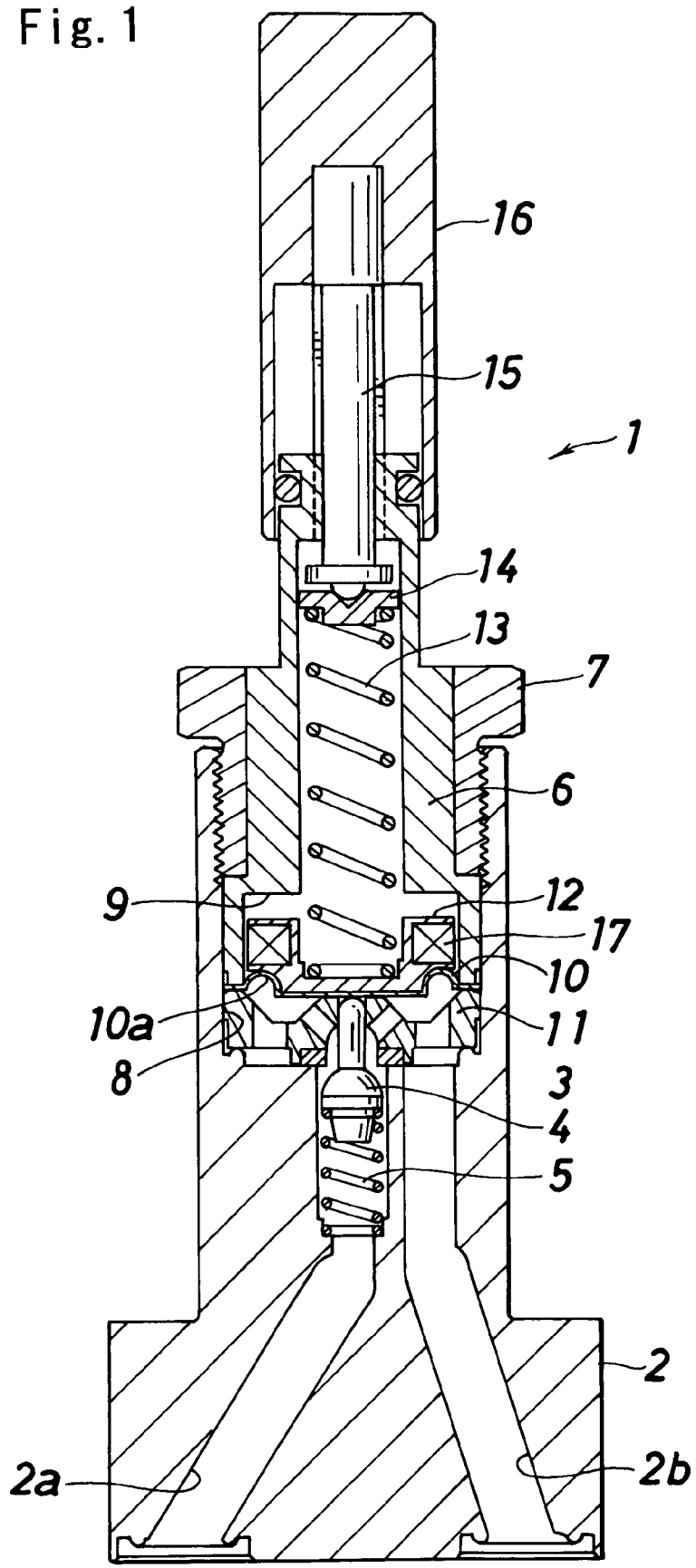
FIG. 1 is a cross-sectional view illustrating an embodiment of a fluid controller according to the present invention, illustrating a normal state (a low-pressure state).

DESCRIPTION OF THE REFERENCE NUMERALS (1) Fluid controller
(3) Valve seat
(4) Poppet (valve element)
(8) Valve chamber
(9) Control chamber
(10) Diaphragm
(12) Movable member
(13) Pressure-setting coil spring
(17) Vibration prevention member
(21) (31) Casing
(22) (32) First coil spring
(23) (33) Second coil spring
(24) (34) Weight member
(26) (36) Casing
(27) (37) Gel
(28) (38) Weight member

PREFERRED EMBODIMENTS FOR CARRYING OUT THE INVENTION

Hereinafter, an embodiment of the present invention will be described, with reference to the drawings. In the following description, the terms "upper", "lower", "left" and "right" mean upper, lower, left and right portions in the drawings.

FIGS. 1 to 4 illustrate a first embodiment of a fluid controller according to the present invention.

Figure 2:
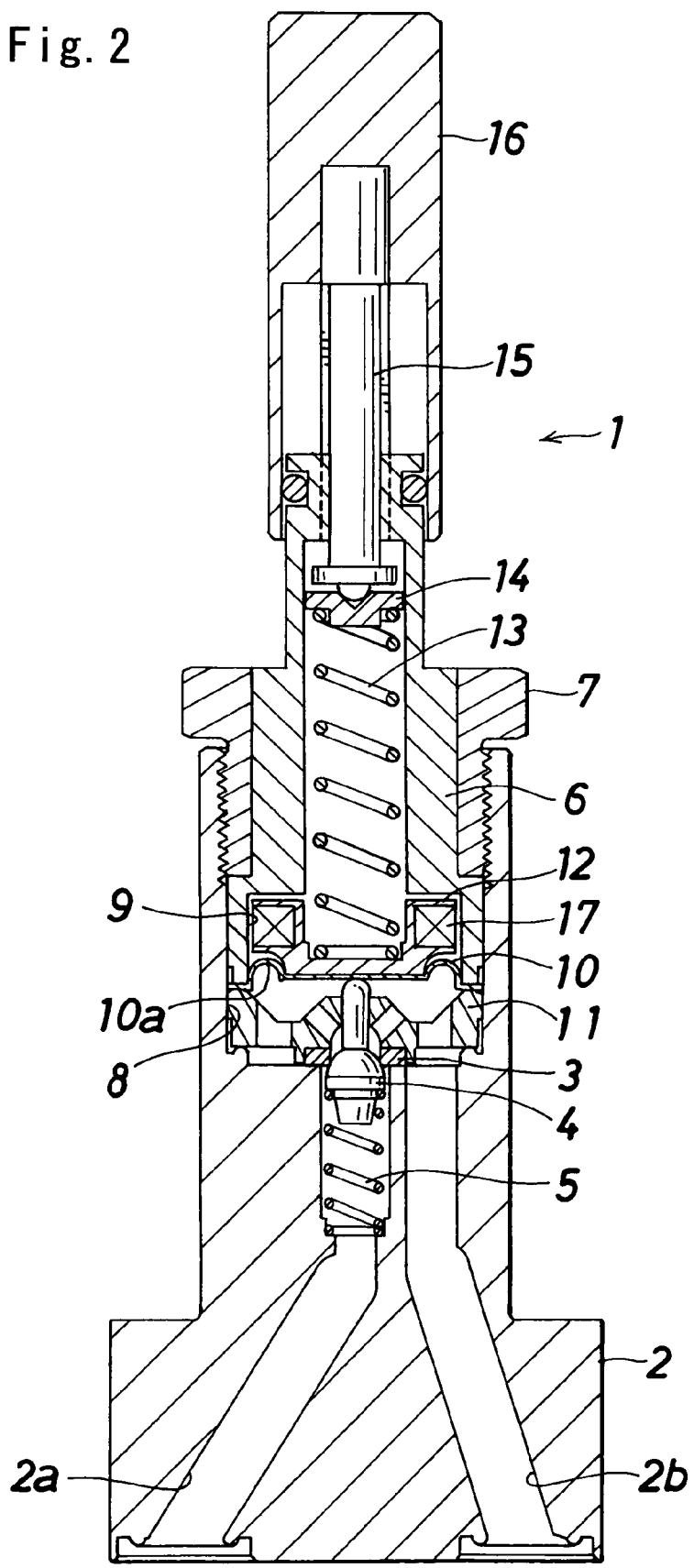
FIG. 2 is a cross-sectional view illustrating the embodiment of the fluid controller according to the present invention, illustrating a state where a pressure of a fluid flowed therein is a high pressure.

As illustrated in FIGS. 1 and 2, a fluid controller (1) includes a valve body (2) having a fluid inlet channel (high-pressure fluid inlet channel) (2a) and a fluid outlet channel (low-pressure fluid outlet channel) (2b), an annular valve seat (3) provided at a peripheral edge of an upward opening of the fluid inlet channel (2a), a poppet (valve element) (4) which is movably placed within the fluid inlet channel (2a), and is adapted to be pushed against the annular valve seat (3) (moved in the direction of close) or be separated from the annular valve seat (3) (moved in the direction of open) for opening and closing the fluid inlet channel (2a), a poppet-biasing coil spring (5) which is placed within the fluid inlet channel (2a) and biases the poppet (4) upwardly, a casing (6) in which a lower end portion is secured through a nut (7) to the upper end portion of the valve body (2), a diaphragm (10) which partitions a space with a substantially cylindrical shape formed by the valve body (2) and the casing (6) into a lower valve chamber (8) and an upper control chamber (9), a channel forming member (11) which forms a channel communicating the opening of the valve seat (3) to the opening of the fluid outlet channel (2b) within the valve chamber (8), a disk-shaped movable member (12) which is mounted to the upper surface of the diaphragm (10) so as to move in the upward and downward directions integrally with the diaphragm (10), a pressure-setting coil spring (13) interposed between the movable member (12) and a spring presser (14) which is movably placed at the upper end portion of the casing (6), a control screw (15) which is mounted to the upper end portion of the casing (6) and moves the spring presser (14) upwardly and downwardly, and a handle (16) for moving the control screw (15) upwardly and downwardly.

The diaphragm (10) is formed to have, for example, a substantially disk shape having an annular convex portion (10a) near an outer peripheral edge portion thereof, and the outer peripheral edge portion is sandwiched between the lower end surface of the casing (6) and the upper surface of the channel forming member (11). The diaphragm (10) is formed to have a movable portion at a portion other than the outer peripheral edge portion. The movable member (12) is formed to have an outer diameter that is substantially the same size as that of the outer diameter of the movable portion of the diaphragm (10) and to have a bottom surface shape along the diaphragm (10). A center portion of the movable member (12) is recessed to form a portion which receives the pressure-setting spring (13), and a vibration prevention member (17) is secured to the portion of the movable member (12) corresponding to the annular convex portion (10a) of the diaphragm (10).

In FIGS. 1 and 2, the structure of the portions other than the movable member (12) and the vibration prevention member (17) is the same as that of a well-known pressure reducing valve, and a principle of the pressure reduction is also well known. Specifically, FIG. 1 illustrates a state where the fluid pressure in the fluid inlet channel (2a) is normal (a low pressure), wherein the downward biasing force of the pressure-setting coil spring (13) is balanced with the upward biasing force of the poppet-biasing coil spring (5) and the fluid pressure, at a state where the poppet (4) and the diaphragm (10) have been pushed downwardly. Further, FIG. 2 illustrates a state where the fluid pressure in the fluid inlet channel (2a) is a high pressure, wherein the downward biasing force of the pressure-setting coil spring (13) is balanced with the upward biasing force of the poppet-biasing coil spring (5) and the fluid pressure, at a state where the poppet (4) and the diaphragm (10) have been pushed upwardly, so that the poppet (4) closes the opening of the valve seat (3) to block the flow of the high-pressure fluid thereinto, and a fluid with a reduced pressure is fed to the fluid outlet channel (2b).

In the fluid controller (1) having the effect of reducing the pressure, if a high-pressure fluid is flowed into the fluid inlet channel (2a) at a large flow rate, the pressure-setting coil spring (13) resonates with the change of the fluid pressure, which prevents stable control. Therefore, the prevention of resonance has been a challenge. In the fluid controller (1) according to the present invention, the movable member (12) and the vibration prevention member (17) are added, in order to prevent such resonance.

Figure 3:
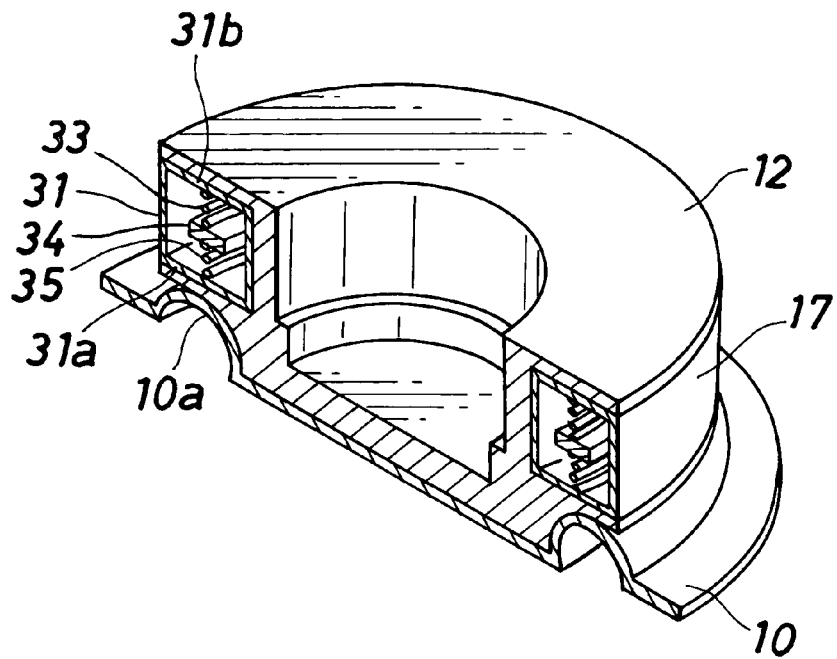
FIG. 3 is a perspective view of a vibration prevention member.
Figure 4:
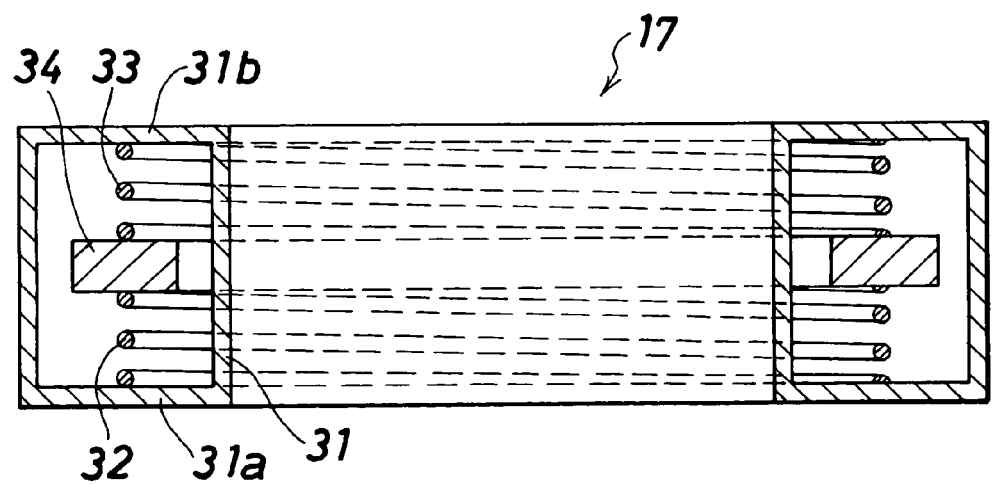
FIG. 4 is a cross-sectional view of an example of the vibration prevention member.

The vibration prevention member (17) is constituted by a doughnut-shaped casing (31) with a rectangular cross section, a first coil spring (32) secured at a lower end thereof to a bottom wall (31a) of the casing (31), a second coil spring (33) secured at an upper end thereof to a top wall (31b) of the casing (31), and a metal annular-shaped weight member (34) interposed between both the coil springs (32) and (33), as illustrated in an enlarged manner in FIGS. 3 and 4. The respective coil springs (32) and (33) are formed to have diameters slightly smaller than the outer diameter of the casing (31), and the numbers of the respective coil springs (32) and (33) used herein are both only one. Although not illustrated, the respective coil springs (32) and (33) can be formed to have diameters substantially equal to a distance difference between the inner diameter and the outer diameter of the casing (31), and pluralities of such coil springs (32) and (33) can be placed in the circumferential direction.

If the fluid pressure is changed to exert an external force to the diaphragm (10) in such a way as to induce a vibration thereof, the diaphragm (10) and the movable member (12) integrated therewith are vibrated. A casing (21) of the vibration prevention member (17) is vibrated integrally with the movable member (12), and the weight member (34) therein is vibrated within the casing (31) with respect to the casing (31). In this case, a natural frequency of the vibration prevention member (17) is made equal to a natural frequency of the entire movable portion including the diaphragm (10), which can reduce the amplitude of the vibration of the entire movable portion including the diaphragm (10), thereby enabling stable control.

Figure 5:
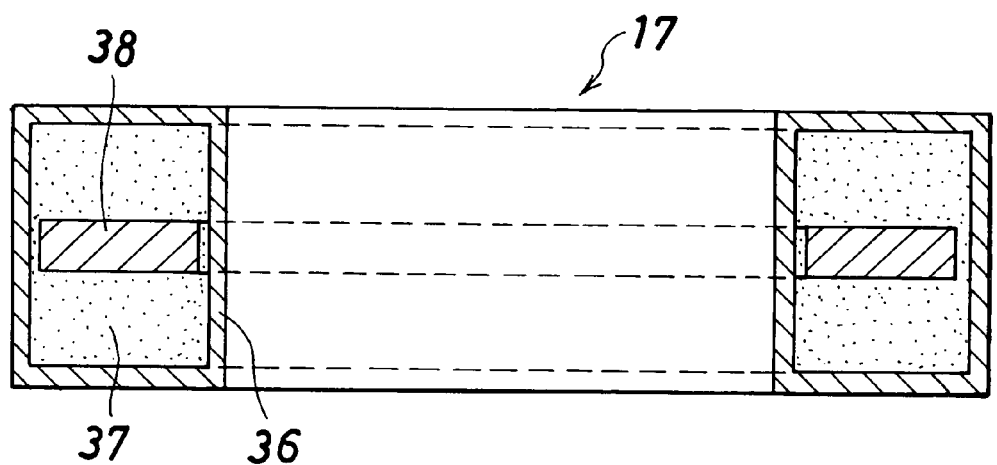
FIG. 5 is a cross-sectional view of another example of the vibration prevention member.

The vibration prevention member (17) can have different structures from the aforementioned structure, provided that a weight member (34) interposed between elastic members (32) and (33) is incorporated in the casing (31) and, for example, the vibration prevention member (17) can be constituted by a doughnut-shaped casing (36) with a rectangular cross section, a gel (37) enclosed within the casing (36), and a metal annular-shaped weight member (38) which is inserted within the gel (37) and sandwiched by the gel (37) at a bottom-wall side and a top-wall side, as illustrated in FIG. 5. In this case, similarly, the natural frequency of the vibration prevention member (17) is made equal to the natural frequency of the entire movable portion including the diaphragm (10), which can reduce an amplitude of the vibration of the entire movable portion including the diaphragm (10), thereby enabling stable control.

Further, the number of the vibration prevention member (17) is not limited to one, and although not illustrated, the vibration prevention members (17) of the respective types illustrated in FIGS. 4 and 5 can be constituted by a plurality of (about 2 to 8) arc-shaped portions which form a doughnut shape as a whole and are separated from one another in the circumferential direction. In this case, in the case of the type employing coil springs, first and second coil springs are placed in each of the arc-shaped portions.

Figure 6:
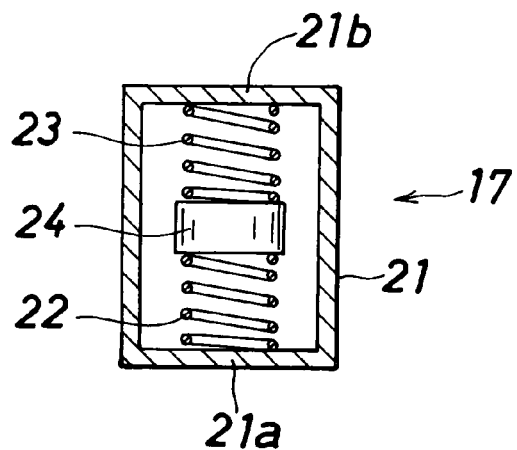
FIG. 6 is a cross-sectional view of still another example of the vibration prevention member.
Figure 7:
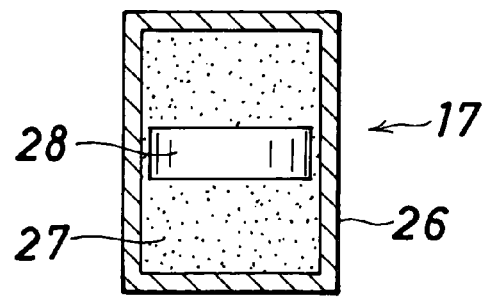
FIG. 7 is a cross-sectional view of yet another example of the vibration prevention member.

The vibration prevention members (17) can be placed at predetermined intervals in the circumferential direction (for example, at 90-degrees interval, the total number of 4) and, in this case, as illustrated in FIG. 6, a single vibration member (17) is constituted by a circular tubular casing (21) closed at upper and lower portions, a first coil spring (22) secured at a lower end to the bottom wall (21a) of the casing (21), a second coil spring (23) secured at its upper end to the top wall (21b) of the casing (21), and a metal short cylindrical-shaped weight member (24) interposed between both the coil springs (22) and (23). In addition, as illustrated in FIG. 7, a single vibration prevention member (17) may be constituted by circular tubular casing (26), a gel (27) enclosed within the casing (26), and a metal short cylindrical weight member (28) which is inserted within the gel (27) and sandwiched by the gel (27) at a bottom-wall side and a top-wall side thereof.

INDUSTRIAL APPLICABILITY

With a fluid controller according to the present invention, it is possible to enhance a vibration preventing characteristic without affecting pressure controlling operations, which contributes to an improvement of performance of the fluid controller which is a pressure reducing valve or the like.

The invention claimed is:
1. A fluid controller comprising
a diaphragm which partitions an inside of the fluid controller into a valve chamber and a control chamber,
a valve seat and a valve element which are provided in the valve chamber, and
a pressure-setting spring provided in the control chamber, the fluid controller being adapted to move the valve element with respect to the valve seat for controlling a pressure of a fluid through a change of balance between a fluid pressure acting on the diaphragm and an elastic force of the pressure-setting spring,
wherein one or more vibration prevention members are placed in a movable member which moves integrally with the diaphragm, and a center portion of the movable member is formed to be a portion for receiving the pressure-setting spring, and the vibration prevention member is secured to an outer peripheral edge portion of the movable member, and the vibration prevention members include a casing which incorporates therein a weight member interposed between elastic members, exerting an elastic force in the same directions as the pressure-setting spring.
2. The fluid controller according to claim 1, wherein the movable member has a disk shape.
3. The fluid controller according to claim 1, wherein the vibration prevention members are placed in a disk-shaped movable member at predetermined intervals in a circumferential direction.
4. The fluid controller according to claim 1, wherein the casing is formed in a doughnut shape having a rectangular cross section within each movable member and the weight member is formed in a doughnut shape.
5. The fluid controller according to claim 1, wherein the vibration prevention member has a doughnut shape.
6. The fluid controller according to claim 5, wherein the vibration prevention member is divided into a plurality of parts in a circumferential direction.
7. The fluid controller according to claim 1, wherein the vibration prevention member includes a casing, a first coil spring placed at a bottom wall-side of the casing, a second coil spring placed at a top wall-side of the casing, and a weight member interposed between both of the coil springs.
8. The fluid controller according to claim 7, wherein the vibration prevention members are placed in a disk-shaped movable member at predetermined intervals in a circumferential direction.
9. The fluid controller according to claim 7, wherein the vibration prevention member has a doughnut shape.
10. The fluid controller according to claim 9, wherein the vibration prevention member is divided into a plurality of parts in a circumferential direction.
11. The fluid controller according to claim 1, wherein the vibration prevention member includes a casing, a gel enclosed within the casing, and a weight member inserted in the gel and sandwiched by the gel at a bottom-wall side and a top-wall side thereof.
12. The fluid controller according to claim 11, wherein the vibration prevention members are placed in a disk-shaped movable member at predetermined intervals in a circumferential direction.
13. The fluid controller according to claim 11, wherein the vibration prevention member has a doughnut shape.
14. The fluid controller according to claim 13, wherein the vibration prevention member is divided into a plurality of parts in a circumferential direction.

* * * * *